United States Patent
Sigmar et al.

(10) Patent No.: US 6,424,931 B1
(45) Date of Patent: *Jul. 23, 2002

(54) REMOTE ACCESS AND CONTROL OF A SEISMIC ACQUISITION SYSTEM

(75) Inventors: Axel Sigmar, Sugarland; James Iseli, Allen; Jozsef Szalay, Austin; Janos Haide, Austin; Andras Feszthammer, Austin, all of TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/340,085

(22) Filed: Jun. 25, 1999

Related U.S. Application Data

(60) Provisional application No. 60/095,704, filed on Aug. 7, 1998.

(51) Int. Cl.[7] .............................................. G06F 19/00
(52) U.S. Cl. ........................................ 702/188; 702/14
(58) Field of Search ................................ 340/539, 15.5, 340/347; 702/16, 14; 367/77

(56) References Cited

U.S. PATENT DOCUMENTS

| | | | | |
|---|---|---|---|---|
| 3,990,036 A | * | 11/1976 | Savit | 340/15.5 |
| 5,822,273 A | * | 10/1998 | Bary et al. | 367/77 |
| 6,031,455 A | * | 2/2000 | Grube et al. | 340/539 |
| 6,041,283 A | * | 4/2000 | Sigmar et al. | 702/16 |

FOREIGN PATENT DOCUMENTS

JP 2000147131 A * 5/2000

* cited by examiner

Primary Examiner—John S. Hilten
Assistant Examiner—Douglas N Washburn
(74) Attorney, Agent, or Firm—Madan, Mossman & Sriram, P.C.

(57) ABSTRACT

A system for remotely controlling, acquiring and monitoring the acquisition of seismic data. The system includes remote equipment for collecting seismic data and for transmitting and receiving communication signals to and from a remote location. The system also includes local equipment for transmitting and receiving communication signals to and from the remote location. In this manner, the collection of seismic data at remote locations can be controlled and monitored locally on a real-time basis.

21 Claims, 3 Drawing Sheets

REMOTE ACCESS AND CONTROL OF A SEISMIC ACQUISITION SYSTEM

CROSS-REFERENCE TO RELATED APPLICATIONS

This application claims the benefit of the filing date of U.S. Provisional Application No. 60/095,704, filed on Aug. 7, 1998, the disclosure of which is incorporated herein by reference.

BACKGROUND OF THE INVENTION

This invention relates generally to remote control systems, and in particular to remote control systems for seismic acquisition systems.

Seismic acquisition systems are used to gather seismic data. Typically seismic acquisition systems are used to gather seismic data in remote locations all around the world. Furthermore, seismic acquisition systems are commonly installed and operated on mobile platforms such as, for example, trucks, barges and boats. Existing seismic acquisition systems do not permit remote control and monitoring of the acquisition of seismic data.

The present invention is directed to overcoming one or more of the limitations of the existing seismic acquisition systems.

SUMMARY OF THE INVENTION

According to one aspect of the present invention, a system for remotely accessing and controlling the acquisition of seismic data has been described that includes a remote seismic acquisition system adapted to collect and transmit seismic data and to transmit and receive communication signals, a remote communication interface device operably coupled to the remote seismic acquisition system, the remote communication interface adapted to transmit and receive communication and seismic data signals, a local communication interface device operably coupled to the remote communication interface, the local communication interface adapted to transmit and receive communication and seismic data signals, and one or more command centers operably coupled to the local communication interface, the command centers adapted to transmit and receive communication and seismic data signals and provide a user interface.

According to another aspect of the present invention, a method of remotely accessing and controlling the acquisition of seismic data also has been described that includes remotely collecting seismic data, remotely transmitting and receiving seismic data and communication signals, locally transmitting and receiving seismic data and communication signals, and locally providing a user interface to the seismic data and communication signals.

DETAILED DESCRIPTION OF THE ILLUSTRATIVE EMBODIMENTS

A system for remotely monitoring and controlling the acquisition of seismic data is disclosed. The system preferably permits remote sensing, monitoring, collection, interpretation, and control of seismic data collection.

In this manner, expert control, advice and interpretation of the collection and processing of seismic data can be provided for a plurality of remote sites from command and control center(s). In a preferred embodiment, the command and control center(s) are locally positioned at locations such as, for example, a local corporate headquarters and/or customer support center. Although the detailed description of the illustrative embodiments is directed to the remote collection, monitoring and control of seismic data, the teachings of the present disclosure will have broad applicability to remote sensing, data collection, monitoring and control of processes generally.

Figure 1:
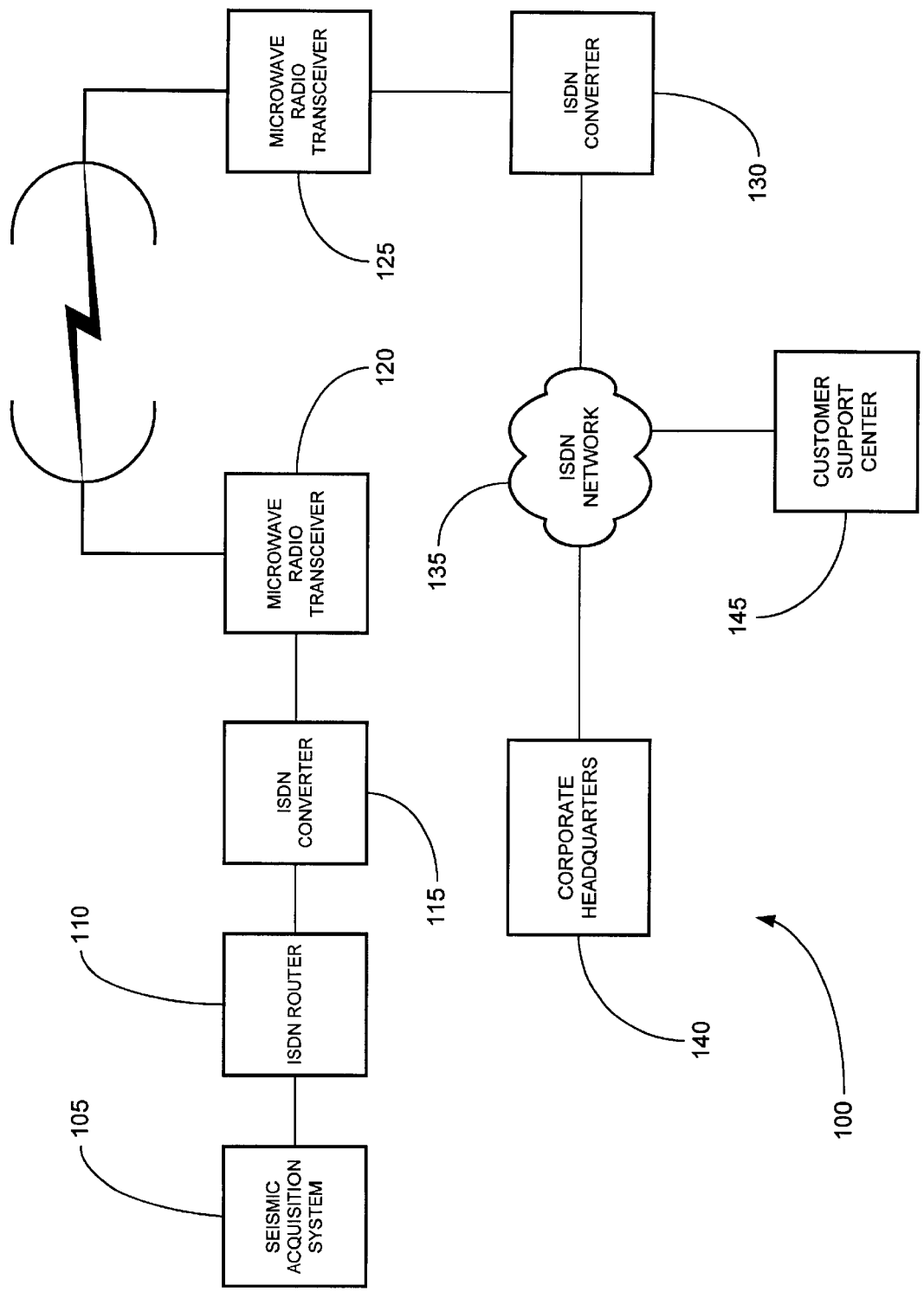
FIG. 1 is a schematic illustration of a first embodiment of a system for remotely controlling and monitoring the acquisition of seismic data.

Referring initially to FIG. 1, a system 100 for remotely controlling and monitoring the acquisition of seismic data includes a seismic data acquisition system 105, an ISDN router 110, an ISDN converter 115, a microwave radio transceiver 120, a microwave radio transceiver 125, an ISDN converter 130, an ISDN network 135, a customer support center 145, and a corporate headquarters 140.

The seismic data acquisition system 105 may comprise any number of conventional commercially available seismic data acquisition systems. In a preferred embodiment, the seismic data acquisition system 105 is adapted using conventional software and hardware to provide real-time remote control and access of the acquisition of seismic data.

The ISDN router 110 is operably coupled to the seismic acquisition system 105 and the ISDN converter 115. The ISDN router 110 may be operably coupled to the seismic acquisition system 105 and the ISDN converter 115 using any number of conventional commercially available interfaces. As will be recognized by persons having ordinary skill in the art, ISDN refers to an integrated services digital network. The ISDN router 110 may comprise any number of conventional commercially available ISDN routers.

The ISDN converter 115 is operably coupled to the ISDN router 110 and the microwave radio transceiver 120. The ISDN converter 115 may be operably coupled to the ISDN router 110 and the microwave radio transceiver 120 using any number of conventional commercially available interfaces. The ISDN converter 115 may comprise any number of conventional commercially available ISDN converters.

The microwave radio transceiver 120 may comprise any number of conventional commercially available microwave radio transceivers. The microwave radio transceiver 120 is operably coupled to the ISDN converter 115 and the microwave radio transceiver 125. The microwave transceiver 120 may be operably coupled to the ISDN converter 115 using any number of conventional commercially available interfaces.

The microwave radio transceiver 125 may comprise any number of conventional commercially available microwave radio transceivers. The microwave radio transceiver 125 is operably coupled to the microwave radio transceiver 120 and the ISDN converter 130. The microwave transceiver 125 may be operably coupled to the microwave radio transceiver 120 and the ISDN converter 130 using any number of conventional commercially available interfaces.

The ISDN converter 130 may comprise any number of conventional commercially available ISDN converters. The ISDN converter 130 is operably coupled to the microwave radio transceiver 125 and the ISDN network 135. The ISDN converter 130 may be operably coupled to the microwave radio transceiver 125 and the ISDN network 135 using any number of conventional commercially available interfaces.

The ISDN network 135 may comprise any number of conventional commercially available ISDN networks. The ISDN network 135 is operably coupled to the ISDN converter 130, the corporate headquarters 140, and the customer support center 145. The ISDN network 135 may be operably coupled to the corporate headquarters 140 and the customer support center 145 using any number of conventional commercially available interfaces.

The corporate headquarters 140 may comprise any number of commercially available corporate headquarters command centers. In a preferred embodiment, the corporate headquarters 140 is adapted using conventional software and hardware to provide real-time remote control and access of the acquisition of seismic data.

The customer support center 145 may comprise any number of conventional commercially available customer support centers. In a preferred embodiment, the customer support center 145 is adapted using conventional software and hardware to provide real-time remote control and access of the acquisition of seismic data.

Figure 2:
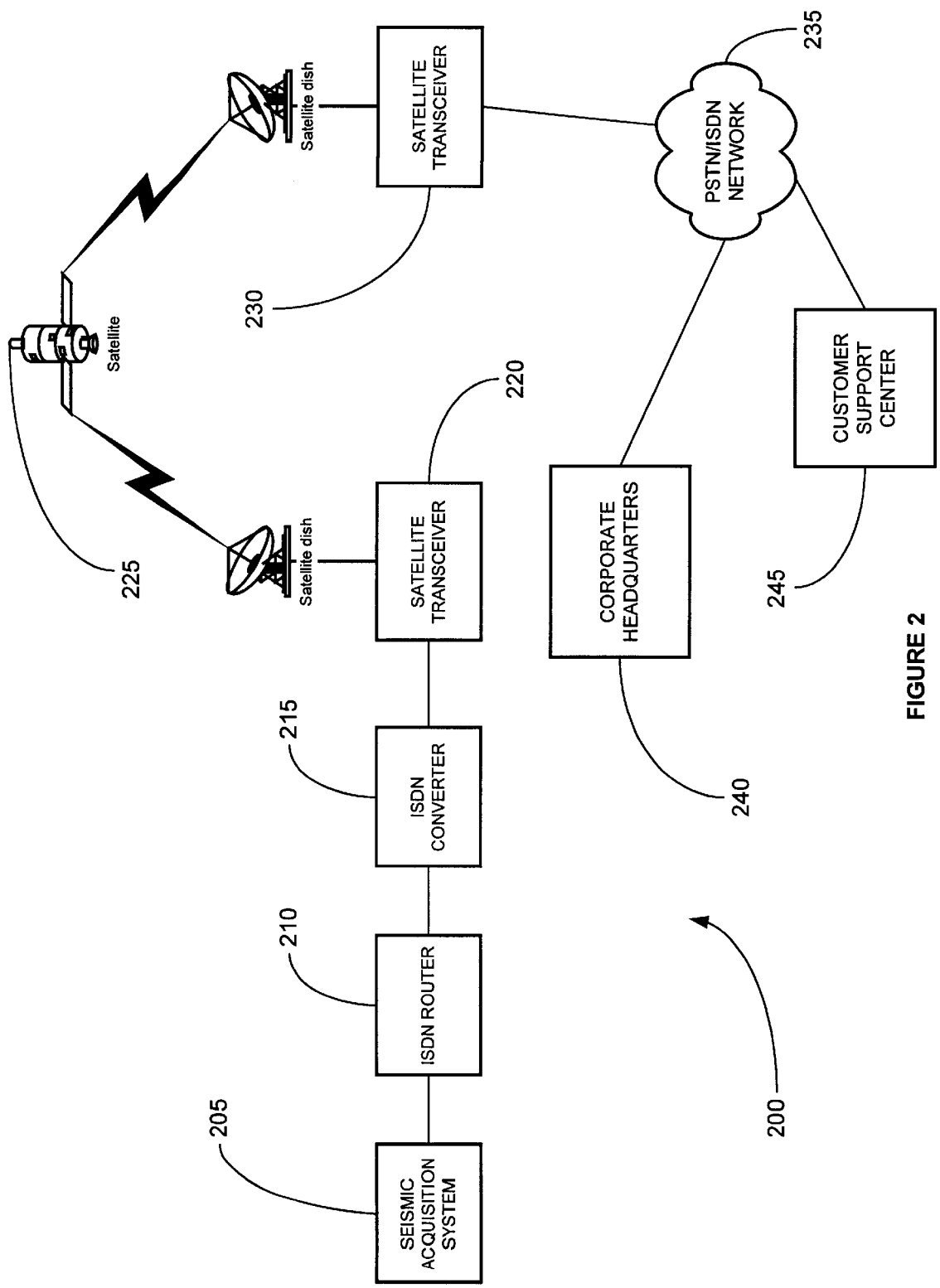
FIG. 2 is a schematic illustration of a second embodiment of a system for remotely controlling and monitoring the acquisition of seismic data.

Referring to FIG. 2, a system 200 for remotely controlling and monitoring the acquisition of seismic data includes a seismic data acquisition system 205, an ISDN router 210, an ISDN converter 215, a satellite transceiver 220, a satellite 225, a satellite transceiver 230, a PSTN/ISDN network 235, a corporate headquarters 240, and a customer support center 245.

The seismic data acquisition system 205 may comprise any number of conventional commercially available seismic data acquisition systems. In a preferred embodiment, the seismic data acquisition system 205 is adapted using conventional software and hardware to provide real-time remote control and access of the acquisition of seismic data.

The ISDN router 210 is operably coupled to the seismic acquisition system 205 and the ISDN converter 215. The ISDN router 210 may be operably coupled to the seismic acquisition system 205 and the ISDN converter 215 using any number of conventional commercially available interfaces. The ISDN router 210 may comprise any number of conventional commercially available ISDN routers.

The ISDN converter 215 is operably coupled to the ISDN router 210 and the satellite transceiver 220. The ISDN converter 215 may be operably coupled to the ISDN router 210 and the satellite transceiver 220 using any number of conventional commercially available interfaces. The ISDN converter 215 may comprise any number of conventional commercially available ISDN converters.

The satellite transceiver 220 may comprise any number of conventional commercially available microwave radio transceivers. The satellite transceiver 220 is operably coupled to the ISDN converter 215 and the satellite 225. The satellite transceiver 220 may be operably coupled to the ISDN converter 215 and the satellite 225 using any number of conventional commercially available interfaces.

The satellite 225 may comprise any number of conventional commercially available satellites. The satellite 225 is operably coupled to the satellite transceivers, 220 and 230. The satellite 225 may be operably coupled to the satellite transceivers, 220 and 230 using any number of conventional commercially interface protocols.

The satellite transceiver 230 may comprise any number of conventional commercially available satellite transceivers. The satellite transceiver 230 is operably coupled to the satellite 225 and the PSTN/ISDN network 235. The satellite transceiver 230 may be operably coupled to the satellite 225 and the PSTN/ISDN network 235 using any number of conventional commercially available interfaces.

The PSTN/ISDN network 235 may comprise any number of conventional commercially available PSTN/ISDN networks. The PSTN/ISDN network 235 is operably coupled to the satellite transceiver 230, the corporate headquarters 240, and the customer support center 245. The PSTN/ISDN network 235 may be operably coupled to the satellite transceiver 230, the corporate headquarters 240 and the customer support center 245 using any number of conventional commercially available interfaces.

The corporate headquarters 240 may comprise any number of commercially available corporate headquarters command centers. In a preferred embodiment, the corporate headquarters 240 is adapted using conventional software and hardware to provide real-time remote control and access of the acquisition of seismic data.

The customer support center 245 may comprise any number of conventional commercially available customer support centers. In a preferred embodiment, the customer support center 245 is adapted using conventional software and hardware to provide real-time remote control and access of the acquisition of seismic data.

Figure 3:
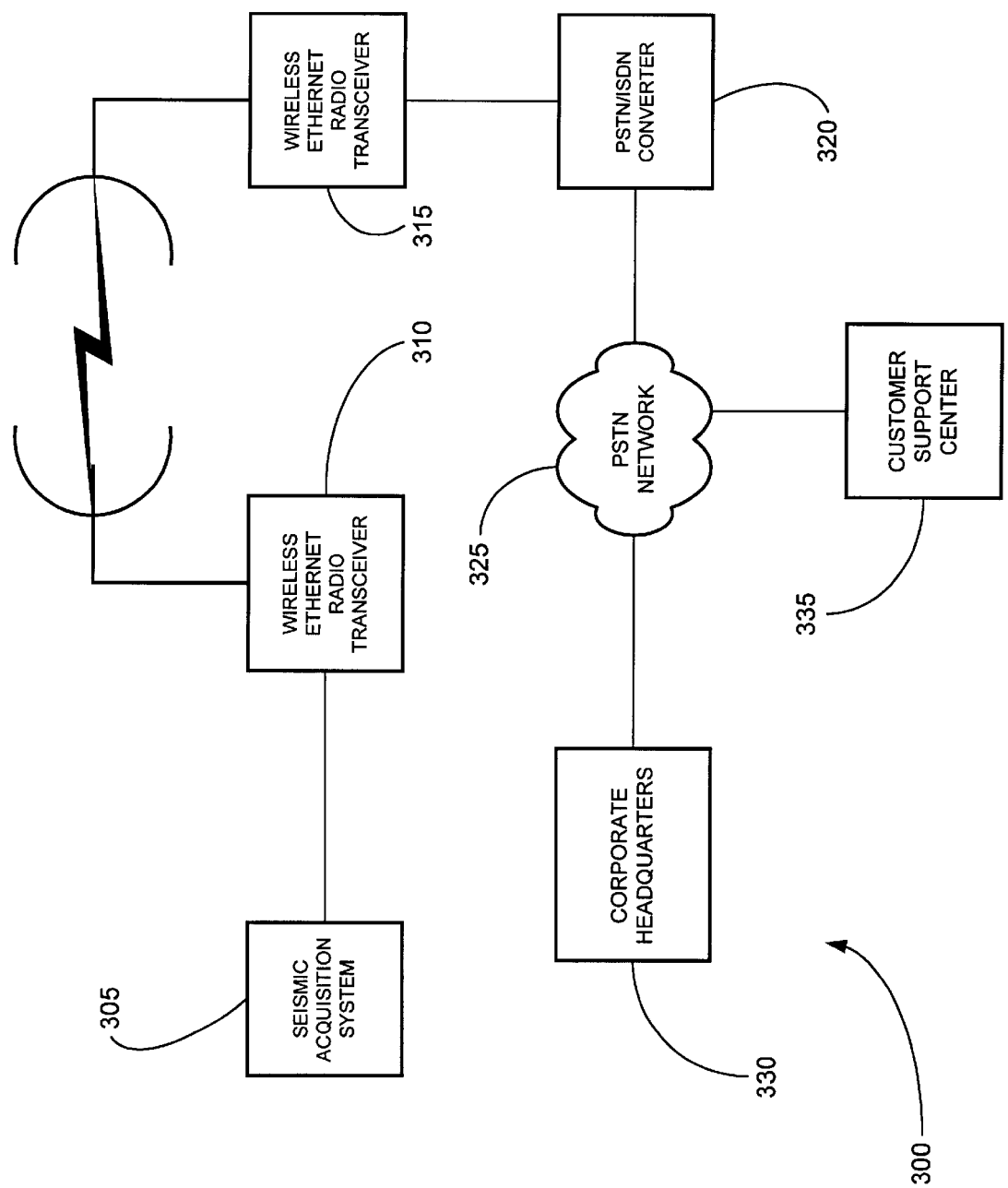
FIG. 3 is a schematic illustration of a third embodiment of a system for remotely controlling and monitoring the acquisition of seismic data.

Referring to FIG. 3, a system 300 for remotely controlling and monitoring the acquisition of seismic data includes a seismic data acquisition system 305, a wireless Ethernet radio transceiver 310, a wireless Ethernet radio transceiver 315, a PSTN/ISDN converter. 320, a PSTN/ISDN network 325, a corporate headquarters 330, and a customer support center 335.

The seismic data acquisition system 305 may comprise any number of conventional commercially available seismic data acquisition systems. In a preferred embodiment, the seismic data acquisition system 305 is adapted using conventional software and hardware to provide real-time remote control and access of the acquisition of seismic data.

The wireless Ethernet radio transceiver 310 may comprise any number of conventional commercially available wireless Ethernet radio transceivers. The wireless Ethernet radio transceiver 310 is operably coupled to the seismic acquisition system 305 and the wireless Ethernet radio transceiver 315. The wireless Ethernet radio transceiver 310 may be operably coupled to the wireless Ethernet radio transceiver 315 and the seismic acquisition system 305 using any number of conventional commercially available interfaces.

The wireless Ethernet radio transceiver 315 may comprise any number of conventional commercially available wireless Ethernet radio transceivers. The wireless Ethernet radio transceiver 315 is operably coupled to the PSTN/ISDN converter 320 and the wireless Ethernet radio transceiver 310. The wireless Ethernet radio transceiver 315 may be operably coupled to the wireless Ethernet radio transceiver 310 and the PSTN/ISDN converter 320 using any number of conventional commercially available interfaces.

The PSTN/ISDN converter 320 may comprise any number of conventional commercially available PSTN/ISDN converters. The PSTN/ISDN converter 320 is operably coupled to the wireless Ethernet radio transceiver 315 and the PSTN/ISDN network 325. The PSTN/ISDN converter 320 may be operably coupled to the wireless Ethernet radio transceiver 315 and the PSTN/ISDN network 325 using any number of conventional commercially available interfaces.

The PSTN/ISDN network 325 may comprise any number of conventional commercially available PSTN/ISDN networks. The PSTN/ISDN network 325 is operably coupled to the PSTN/ISDN converter 320, the corporate headquarters 330, and the customer support center 335. The PSTN/ISDN network 325 may be operably coupled to the PSTN/ISDN converter 320, the corporate headquarters 330 and the customer support center 335 using any number of conventional commercially available interfaces.

The corporate headquarters 330 may comprise any number of commercially available corporate headquarters command centers. In a preferred embodiment, the corporate headquarters 330 is adapted using conventional software and hardware to provide real-time remote control and access of the acquisition of seismic data.

The customer support center 335 may comprise any number of conventional commercially available customer support centers. In a preferred embodiment, the customer support center 335 is adapted using conventional software and hardware to provide real-time remote control and access of the acquisition of seismic data.

A system for remotely accessing and controlling the acquisition of seismic data has been described that includes a remote seismic acquisition system adapted to collect and transmit seismic data and to transmit and receive communication signals, a remote communication interface device operably coupled to the remote seismic acquisition system, the remote communication interface adapted to transmit and receive communication and seismic data signals, a local communication interface device operably coupled to the remote communication interface, the local communication interface adapted to transmit and receive communication and seismic data signals, and one or more command centers operably coupled to the local communication interface, the command centers adapted to transmit and receive communication and seismic data signals and provide a user interface. In a preferred embodiment, the remote communication interface includes a microwave radio transceiver. In a preferred embodiment, the remote communication interface further includes an ISDN communications interface. In a preferred embodiment, the remote communication interface includes a satellite transceiver. In a preferred embodiment, the remote communication interface further includes an ISDN communications interface. In a preferred embodiment, the remote communication interface includes a wireless Ethernet radio transceiver. In a preferred embodiment, the local communication interface includes a microwave radio transceiver. In a preferred embodiment, the local communication interface further includes an ISDN communications interface. In a preferred embodiment, the local communication interface includes a satellite transceiver. In a preferred embodiment, the local communication interface further includes an ISDN communications interface. In a preferred embodiment, the local communication interface further includes a PSTN communications interface. In a preferred embodiment, the local communication interface includes a wireless Ethernet radio transceiver.

A method of remotely accessing and controlling the acquisition of seismic data also has been described that includes remotely collecting seismic data, remotely transmitting and receiving seismic data and communication signals, locally transmitting and receiving seismic data and communication signals, and locally providing a user interface to the seismic data and communication signals. In a preferred embodiment, the transmitting and receiving is performed on a real time basis. In a preferred embodiment, the local user interface to the seismic data is distributed. In a preferred embodiment, the method further includes locally monitoring the acquisition of seismic data. In a preferred embodiment, the method further includes locally controlling the acquisition of seismic data. In a preferred embodiment, the local monitoring is distributed. In a preferred embodiment, the local controlling is distributed. In a preferred embodiment, the local monitoring is performed on a real time basis. In a preferred embodiment, the local controlling is performed on a real time basis.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A system for remotely accessing and controlling the acquisition of seismic data, comprising:

a remote seismic acquisition system adapted to collect and transmit seismic data and to transmit and receive communication signals;

a remote communication interface device operably coupled to the remote seismic acquisition system, the remote communication interface adapted to transmit and receive communication and seismic data signals;

a local communication interface device operably coupled to the remote communication interface, the local communication interface adapted to transmit and receive communication and seismic data signals; and one or more command centers operably coupled to the local communication interface, the command centers adapted to transmit and receive communication and seismic data signals and provide a user interface.

2. The system of claim 1, wherein the remote communication interface includes:

a microwave radio transceiver.

3. The system of claim 2, wherein the remote communication interface further includes:

an ISDN communications interface.

4. The system of claim 1, wherein the remote communication interface includes:

a satellite transceiver.

5. The system of claim 4, wherein the remote communication interface further includes:

an ISDN communications interface.

6. The system of claim 1, wherein the remote communication interface includes:

a wireless Ethernet radio transceiver.

7. The system of claim 1, wherein the local communication interface includes:

a microwave radio transceiver.

8. The system of claim 7, wherein the local communication interface further includes:

an ISDN communications interface.

9. The system of claim 1, wherein the local communication interface includes:

a satellite transceiver.

10. The system of claim 9, wherein the local communication interface further includes:

an ISDN communications interface.

11. The system of claim 9, wherein the local communication interface further includes:

a PSTN communications interface.

12. The system of claim 1, wherein the local communication interface includes:

a wireless Ethernet radio transceiver.

13. A method of remotely accessing and controlling the acquisition of seismic data, comprising:

remotely collecting seismic data;

remotely transmitting and receiving data and communication signals;

locally transmitting and receiving seismic data and communication signals from a command center; and locally providing a user interface to the seismic data and communication signals at the command center.

14. The method of claim 13, wherein the transmitting and receiving is performed on a real time basis.

15. The method of claim 13, wherein the local user interface to the seismic data is distributed.

16. The method of claim 13, further including locally monitoring the acquisition of seismic data.

17. The method of claim 13, further including locally controlling the acquisition of seismic data.

18. The method of claim 16, wherein the local monitoring is distributed.

19. The method of claim 17, wherein the local controlling is distributed.

20. The method of claim 16, wherein the local monitoring is performed on a real time basis.

21. The method of claim 17, wherein the local controlling is performed on a real time basis.

* * * * *